United States Patent [19]
Schmitt et al.

[11] Patent Number: 5,794,948
[45] Date of Patent: Aug. 18, 1998

[54] CHUCK ASSEMBLY

[75] Inventors: Peter J. Schmitt, Ontario; Eugene A. Swain, Webster; Kamran U. Zaman, Pittsford; Alan D. Smith, W. Henrietta, all of N.Y.

[73] Assignee: Xerox Corporation, Stamford, Conn.

[21] Appl. No.: 745,543

[22] Filed: Nov. 12, 1996

[51] Int. Cl.$^6$ .................. B05C 13/02; B23B 31/40
[52] U.S. Cl. .................. 279/2.17; 118/503; 269/48.1; 294/93
[58] Field of Search .................. 279/2.01, 2.1–2.12, 279/2.17, 2.22; 269/48.1; 294/93, 94, 98.1; 198/803.7–803.9, 803.12; 118/500, 503; 242/571.1, 571.8

[56] References Cited

U.S. PATENT DOCUMENTS

| | | | |
|---|---|---|---|
| 2,870,794 | 1/1959 | Thaxton | 294/94 |
| 3,682,409 | 8/1972 | Hope et al. | 242/571.8 |
| 4,770,456 | 9/1988 | Phillips et al. | 279/2.17 |
| 5,282,888 | 2/1994 | Fukawa et al. | 118/500 |
| 5,320,364 | 6/1994 | Mistrater et al. | 279/2.17 |
| 5,322,300 | 6/1994 | Mistrater et al. | 279/2.17 |
| 5,324,049 | 6/1994 | Mistrater et al. | 279/2.17 |
| 5,328,181 | 7/1994 | Mistrater et al. | 279/2.17 |
| 5,520,399 | 5/1996 | Swain et al. | 269/48.1 |

*Primary Examiner*—Steven C. Bishop
*Attorney, Agent, or Firm*—Zosan S. Soong

[57] ABSTRACT

A chuck assembly defining a longitudinal axis for internally holding a hollow substrate is disclosed including: (a) a stationary top pressing member; (b) a bottom pressing member movable along the longitudinal axis; (c) an elastic bag defining an opening, a top region, a side wall, and a bottom region, wherein the bag is stretchable along the longitudinal axis and a portion of the top region adjacent the side wall is immobilized against the stationary top pressing member during the stretching of the bag and a portion of the bottom region is coupled to the bottom pressing member; and (d) a width changing apparatus movable along the longitudinal axis, wherein the width changing apparatus is operatively coupled to the bottom pressing member.

9 Claims, 2 Drawing Sheets

CHUCK ASSEMBLY

BACKGROUND OF THE INVENTION

This invention invention relates generally to an apparatus for internally holding a substrate such as a drum or a belt for processing. More specifically, the invention relates to a chuck assembly for a belt such as a seamless belt having a relatively large inner diameter ranging for example from about 60 to about 300 mm.

For certain processing steps such as dip coating substrates during the fabrication of photosensitive members, it is preferred that the end of the substrate rests against the alignment shoulder of the chuck assembly. This precisely controls the level of coating on the substrate. However, there is a risk of crushing the substrate if it were necessary to precision locate the end of the substrate against alignment shoulder of the chuck assembly prior to chucking. There is a need, which the present invention addresses, for a new chuck assembly which can automatically pull up the substrate towards the alignment shoulder without damage to the substrate.

The following documents disclose conventional chuck assemblies: Fukawa et al., U.S. Pat. No. 5,282,888; Mistrater et al., U.S. Pat. No. 5,322,300; Mistrater et al., U.S. Pat. No. 5,328,181; Mistrater et al., U.S. Pat. No. 5,320,364; and Mistrater et al., U.S. Pat. No. 5,324,049.

SUMMARY OF THE INVENTION

The present invention is accomplished in embodiments by providing a chuck assembly defining a longitudinal axis for internally holding a hollow substrate comprising:

(a) a stationary top pressing member;

(b) a bottom pressing member movable along the longitudinal axis;

(c) an elastic bag defining an opening, a top region, a side wall, and a bottom region, wherein the bag is stretchable along the longitudinal axis and a portion of the top region adjacent the side wall is immobilized against the stationary top pressing member during the stretching of the bag and a portion of the bottom region is coupled to the bottom pressing member; and (d) a width changing apparatus movable along the longitudinal axis, wherein the width changing apparatus is operatively coupled to the bottom pressing member.

BRIEF DESCRIPTION OF THE DRAWINGS

Other aspects of the present invention will become apparent as the following description proceeds and upon reference to the Figures which represent preferred embodiment.

Unless otherwise noted, the same reference numeral in different Figures refers to the same or similar feature.

DETAILED DESCRIPTION

Figure 1:
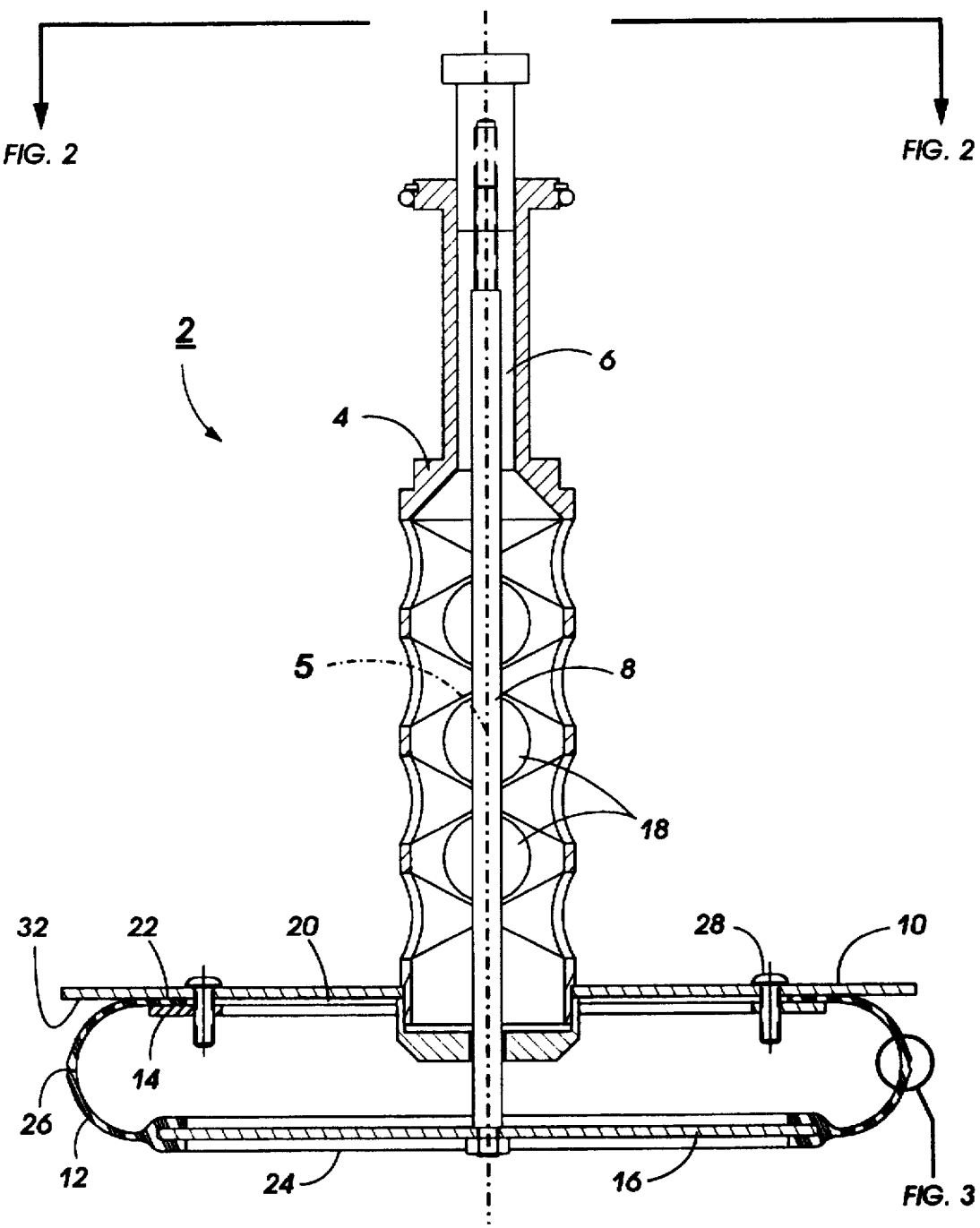
FIG. 1 is a side cross-sectional view of one embodiment of the chuck assembly.
Figure 2:
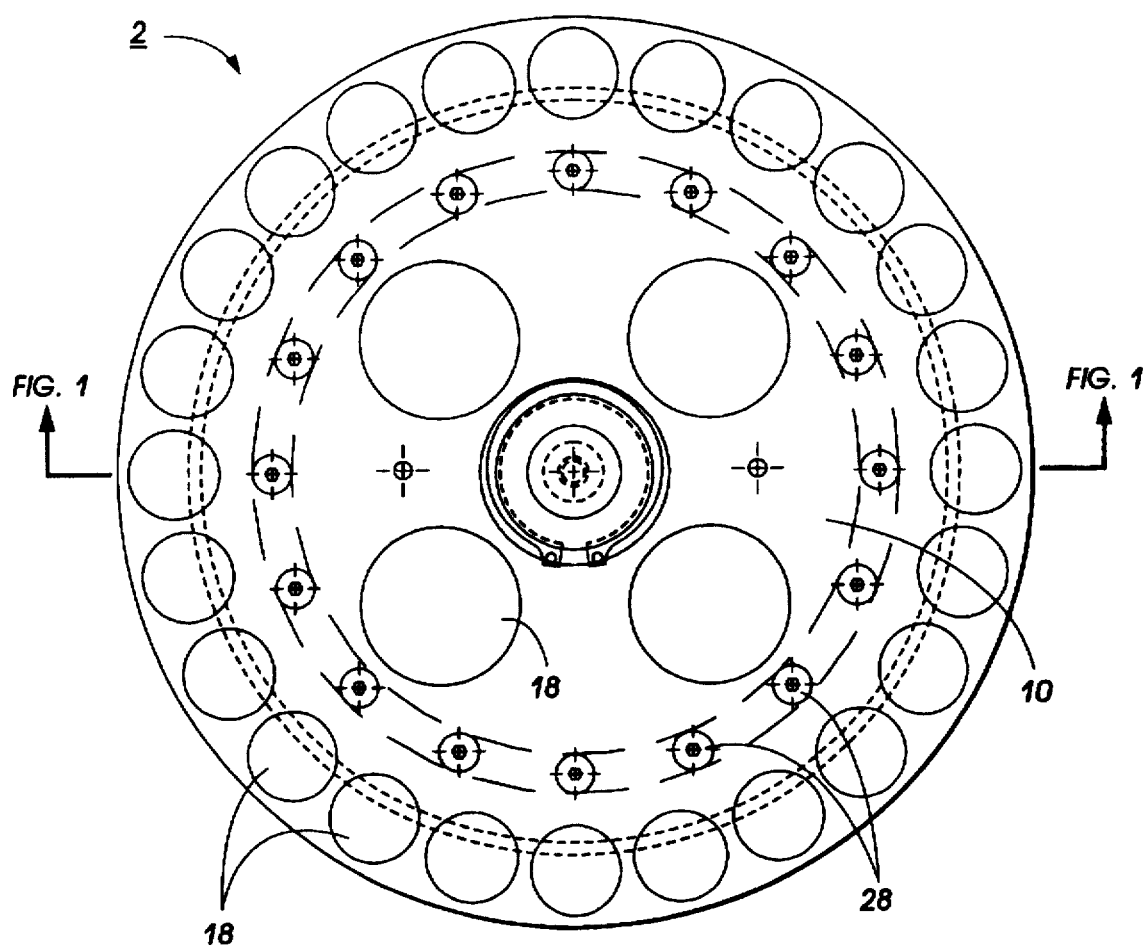
FIG. 2 is, top view of the embodiment of FIG. 1.

FIGS. 1–2 depict a chuck assembly 2 including a body 4 defining a passageway 6, a width changing apparatus 8 (movable along the longitudinal axis 5) in the form of for example a rod disposed in the passageway 6 along the length of the body 4, a stationary top pressing member 10 coupled to the body 4, a bag 12, a clamp ring 14, and a vertically movable bottom pressing member 16. The top pressing member 10 and the bottom pressing member 16 are preferably round plates that are substantially parallel to each other. The body 4 and the top pressing member 10 may define a plurality of holes 18 to reduce weight and to provide air flow. The width changing apparatus 8 may be spring loaded and is operatively coupled to the bottom pressing member 16.

The bag 12 defines an opening 20, a top region 22 adjacent the opening 20, a bottom region 24, and a side wall 26 joining the top region 22 and the bottom region 24, where the precise dimensions of each region may vary in embodiments. The side wall 26 may be defmed in embodiments as the region of the bag that extends from the edge of the mechanical device such as the clamp ring 14 or an adhesive layer (which pins a portion of the top region adjacent the side wall against the top pressing member) to the edge of the bottom pressing member 16, where there is absent a mechanical device or an adhesive layer to press or adhere that region of the bag against the top pressing member. A portion of the top region 22 adjacent the side wall 26 is sandwiched between the top pressing member 10 and the clamp ring 14, thereby immobilizing the portion of the top region adjacent the side wall against the top pressing member. In embodiments, the entire top region is immobilized against the top pressing member by a mechanical device such as a clamp ring or an adhesive layer. A plurality of fasteners 28 couples the clamp ring 14 to the top pressing member 10. The bottom pressing member 16 may be a plate that is molded in the bottom region 24. Alternatively, the bottom pressing member may be adhered to the bottom region using an adhesive. A portion of the bottom region, preferably the entire bottom region, is coupled to the bottom pressing member.

Figure 3:
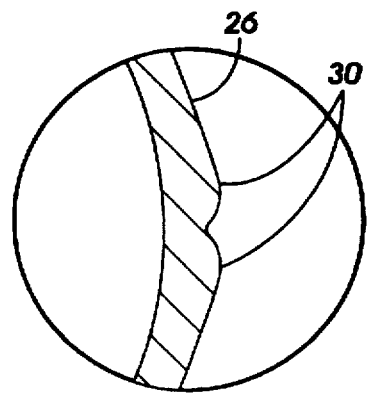
FIG. 3 is a more detailed side cross-sectional view of a portion of the chuck assembly of FIG. 1.

FIG. 3 represents a preferred embodiment where there are a plurality of bumps 30 such as two, three, or more located on the side wall 26 and extending around the entire outer circumference of the bag. These bumps may range in height from about 3 to about 10 mm, and preferably from about 5 to about 8 mm. The distance between the bumps, center to center, may range from about 3 to about 10 mm, and preferably from about 5 to about 8 mm. These bumps facilitate the creation of a hermetic seal inside the substrate by providing multiple line contacts with the substrate.

Operation of the chuck assembly proceeds as follows where the width of the bag prior to engagement of the chuck assembly with the substrate is larger than the substrate inner width. The initial position of the chuck assembly where the bag is in an unstretched condition and prior to movement downwards of the width changing apparatus is referred herein as the natural state. To commence, the width changing apparatus is depressed downwards along the longitudinal axis. The bottom pressing member coupled to the width changing apparatus also moves downward, thereby stretching the elastic bag downwards and decreasing the width of the bag. The bag is then inserted into an end of the substrate. The width changing apparatus and the attached bottom pressing member are moved upwards which flattens the bag and increases the width of the bag to contact the side wall with the substrate inner surface to hold the substrate. Thus, in embodiments, the chuck assembly holds the substrate in the natural state. In embodiments, the chuck assembly has a pull up action where the substrate is pulled up slightly and the end of the substrate may contact the alignment shoulder 32 defmed by the top pressing member 10 during engagement of the bag with the substrate. The pull up action is due to the substantially simultaneous engagement of the bag side wall with the substrate and the upward movement of the bag side wall as the bag returns to the unstretched condition. After processing of the substrate, the width changing apparatus is depressed to shrink the bag width as discussed above, thereby allowing withdrawal of the chuck assembly from the substrate.

The present chuck assembly has one or more of the following characteristics: hermetic sealing, achievement of pull off and pull up forces, low mass, simplicity, precision location of the substrate end to the alignment shoulder of the chuck assembly, low cost, air flow enabling, and ease of operation. The advantage of immobilizing (referred herein also as "capturing") the top region of the bag closer to the side wall, as compared with a chuck assembly capturing the top region further away from the side wall, is that the shorter the distance, the greater the outward force and the greater the pull up force. In addition, the present chuck assembly affords a continuous range of bag widths as the bag is stretched and allowed to return to the unstretched condition.

During engagement of the chuck assembly with the substrate, it is preferred that a hermetic seal is created by contact of the bag against the substrate inner surface to minimize or prevent fluid migration, especially liquid, into the interior of the substrate.

The bag may be molded into the shape of FIG. 1 having the curved side wall. The bag may be fabricated from any suitable material including for instance silicone, such as silicone rubber compound no. 88201 available from Garlock Corporation, and flexible/elastic high temperature elastomers such as VITON™ and ZETPOL 2000™ (hydrogenated nitrile elastomer—HNBr). The bag may have a wall thickness ranging for example from about 1 mm to about 5 mm. The other components of the chuck assembly may be fabricated from any suitable material. For example, the width changing apparatus, the top pressing member, and the bottom pressing member are fabricated from a metal such as steel and aluminum or a plastic.

Any suitable rigid or flexible substrate may be held by the present chuck assembly. The substrate may have a cylindrical cross-sectional shape or a noncylindrical cross-sectional shape such as an oval shape. The substrate may be at least partially hollow, and preferably entirely hollow, with one or both ends being open. In preferred embodiments, the substrate is involved in the fabrication of photoreceptors and may be bare or coated with layers such as photosensitive layers typically found in photoreceptors. The substrate may have any suitable dimensions. An advantage of the chuck assembly in embodiments is that it embodies low mass and therefore may not cause excessive heat flow from a thin substrate to the chuck assembly when placed in an oven.

Other modifications of the present invention may occur to those skilled in the art based upon a reading of the present disclosure and these modifications are intended to be included within the scope of the present invention.

We claim:

1. A chuck assembly defining a longitudinal axis for internally holding a hollow substrate comprising:

(a) a stationary top pressing member;

(b) a bottom pressing member movable along the longitudinal axis;

(c) an elastic bag defining an opening, a top region, a side wall, and a bottom region, wherein the bag is stretchable along the longitudinal axis and a portion of the top region adjacent the side wall is immobilized against the stationary top pressing member during the stretching of the bag and a portion of the bottom region is coupled to the bottom pressing member;

(d) a width changing apparatus movable along the longitudinal axis, wherein the width changing apparatus is operatively coupled to the bottom pressing member, wherein the bag forms a hermetic seal inside the substrate; and (e) a material in contact with the portion of the top region of the bag adjacent to the side wall to immobilize the portion of the top region adjacent to the side wall against the stationary top pressing member during the stretching of the bag.

2. The chuck assembly of claim 1, wherein the width changing apparatus comprises a rod.

3. The chuck assembly of claim 1, wherein the top pressing member defines a plurality of holes.

4. The chuck assembly of claim 1, wherein the bottom pressing member is a plate molded in the bottom region.

5. The chuck assembly of claim 1, wherein the top pressing member is a plate.

6. The chuck assembly of claim 1, further comprising a clamp ring wherein the top region adjacent the side wall is sandwiched between the top pressing member and the clamp ring.

7. The chuck assembly of claim 1, wherein the width of the bag prior to engagement of the chuck assembly with the substrate is larger than the substrate inner width.

8. The chuck assembly of claim 1, wherein the side wall is curved prior to engagement of the chuck assembly with the substrate.

9. The chuck assembly of claim 1, wherein the material includes a clamp ring.

* * * * *